United States Patent

Brown

[11] 3,907,946
[45] Sept. 23, 1975

[54] FUEL SYSTEM
[76] Inventor: David A. Brown, P.O. Box 341, Bay, Ark. 72411
[22] Filed: June 20, 1974
[21] Appl. No.: 481,194

[52] U.S. Cl......... 261/142; 55/DIG. 28; 123/122 E; 123/133; 261/51
[51] Int. Cl........................................... F02m 15/04
[58] Field of Search........... 123/122 E, 133, 119 R; 55/DIG. 28, 385; 261/142, 51, DIG. 79

[56] References Cited
UNITED STATES PATENTS
2,661,937  12/1953  Kihler............................ 55/DIG. 28
2,927,848  3/1960  Baverstock................... 55/DIG. 28
2,983,592  5/1961  Jones............................. 55/DIG. 58

Primary Examiner—Charles J. Myhre
Assistant Examiner—R. H. Lazarus

[57] ABSTRACT

A fuel system for a gasoline fueled spark-ignited internal combustion engine in which gasoline is vaporized by an electrical heating system, the vapor mixed with air, then the mixture supplied to the intake manifold of an engine.

10 Claims, 4 Drawing Figures

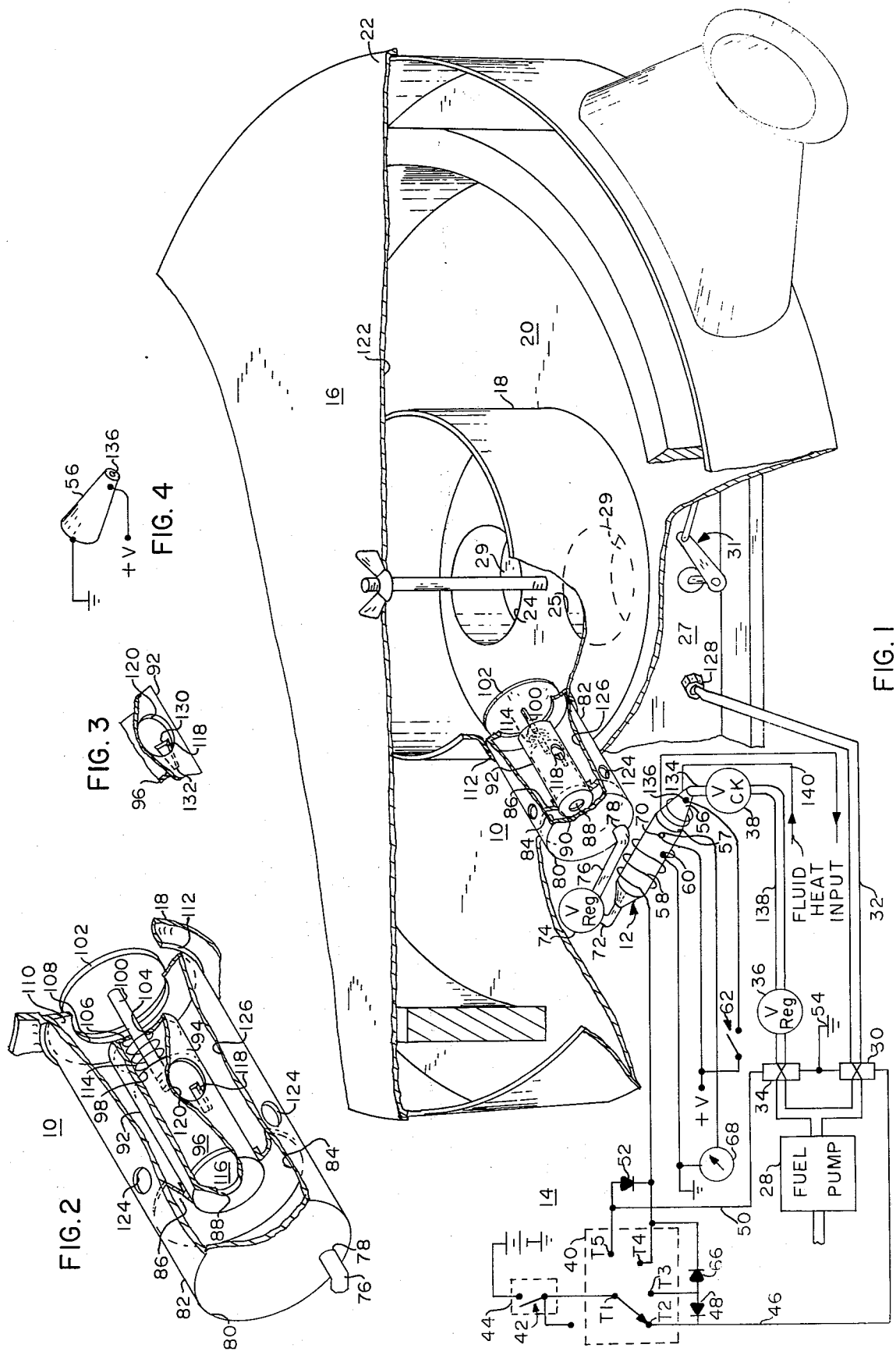

FUEL SYSTEM

BACKGROUND OF THE INVENTION

1. Field of the Invention

This invention relates to fuel systems, and particularly to a fuel system which vaporizes gasoline before mixing it with air and supplying it to an engine.

2. Description of the Prior Art

Various attempts have been made in the past to provide a practical system of operating a spark-ignited gasoline fuel internal combustion engine by first vaporizing gasoline before mixing the gasoline with air and supplying it to the engine. The applicant knows of no operable and practical system ever having been developed.

SUMMARY OF THE INVENTION

In accordance with the present invention, gasoline is heated by electrical means and supplied through a pressure regulator to a fuel-air mixing chamber. This mixing chamber includes a vacuum-operated valve which variably couples the fuel-air mixture to the inlet manifold of an engine through a conventional pedal-operated butterfly valve. Also linked to the vacuum-operated valve is a vapor valve which varies the vapor opening to the mixing chamber as a selected proportion of the open state of the vacuum-operated valve. Thus, as a demand for engine acceleration is indicated by pressing an accelerometer pedal, the butterfly valve is opened, admitting fuel to the engine. As a result of this, the manifold vacuum is transferred from below the butterfly valve to the chamber between the butterfly valve and the vacuum-operated valve. As a result of this, the vacuum-operated valve opens more, admitting more air-fuel mixture to the engine, and thus the engine accelerates.

BRIEF DESCRIPTION OF THE DRAWINGS

FIG. 1 is a combined pictoral-schematic illustration of an embodiment of the invention.

FIG. 2 is a pictoral view of the mixing valve assembly.

FIG. 3 is a partial pictoral view of a modified form of the fuel inlet valve.

FIG. 4 is a partial pictoral view of an alternate form of fuel heating means.

DETAILED DESCRIPTION OF THE DRAWINGS

The vaporized fuel system shown in the drawings generally consists of mixing valve 10, vaporization chamber 12, and external control circuitry 14. Mixing valve 10 and vaporization chamber 12 are supported within the interior of conventional air filter assembly 16, shown in place atop a conventional carburetor. Mixing valve 10 is supported to the peripheral wall of circular member 18, which is open at each end; and when attached as shown in FIG. 1, the open ends are sealably mated with bottom pan 20 of air filter 16 and upper cover 22 of air filter 16. This member surrounds input air intakes 24 and 25 formed in the interior body of carburetor 27, and thus the necessary air to be supplied to the engine is metered into interior region 26 of circular member 18 through mixing valve 10.

The vehicle to which this system is added may be operated in a conventional manner, wherein liquid from a fuel tank (not shown) is pumped by fuel pump 28 and is selectively fed by solenoid valve 34, regulator 36 (at an output pressure of 1 to 7 PSI), and check valve 38 to the evaporation chamber of the vaporized fuel induction system. Operation of the system is enabled by four-position switch 40, movable contact T1 of which is connected to one set of contacts 42 of ignition switch 44 of a vehicle, which is in turn connected to the positive side of a vehicle battery. One lead 46 of solenoid valve 30 is connected to the cathode of isolation diode 48 and contact T2 of switch 40. One lead 50 of solenoid valve 34 is connected to contact T5 of switch 40 and to the anode of isolation diode 52. The opposite leads of solenoid valves 30 and 34 are tied to common ground 54. Evaporation chamber 12 is heated from one or both of two sources. Solid nichrome element 56, through which fuel is injected into evaporation chamber 12, is adapted to heat or vaporize the inflowing fuel in approximately three to four seconds. One end 57 of heating element 58 is grounded (connected to the negative terminal of the vehicle battery) through the housing of vaporization chamber 12 and ground terminal 60. The outer end of element 58 is selectively tied to +V battery supply through switch contacts 62. This heating element may be omitted if instant starting (in less than three seconds) of the vapor system is not necessary. The second and sustaining heating element 58 of vaporization chamber 12 is connected between ground terminal 60 and contacts T4 of four-position switch 40. This heating element is also energized through isolation diodes 52 and 66, the anodes of which are tied to contacts T3 and T5 of four-position switch 40. The temperature of vaporization chamber 12 is indicated by temperature gauge 68, one terminal of which is grounded and the other terminal of which is connected through temperature sensor 70 of vaporization chamber 12 to +V battery potential.

Vaporized fuel is fed through outlet conduit 72 of vaporization chamber 12 to regulator valve 74, which regulates the vapor pressure to between 0.2 and 2 pounds of pressure. The output of this valve is connected into a second conduit 76, the outlet end of which is connected to inlet opening 78 near the lower periphery of end closing member 80 of cylindrical outer housing 82 of mixing valve 10. A reserve quantity of vaporized fuel is thus stored in reserve vapor chamber 84 and then fed through inlet 88 of one end closing member 90 of fuel supply valve 92. Fuel supply valve 92 (FIG. 2) includes elongated cylinder 94 within which is disposed sliding hollow piston 96. Head member 98 of piston 96 is attached to stem 100 of vacuum-operated valve 102. The valve stem extends through opening 104 of the opposite closing member 106 of cylinder 94, and the head of the valve seats about opening 108 formed in closing member 110 of outer cylindrical housing 82. Housing 82 is supported to cylindrical member 18 by circular sleeve 112 formed in the peripheral wall of cylindrical member 18. Valve 102 is held in a closed position by compression spring 114, which is supported between head member 98 of piston 96 and end closing member 106 of cylinder 94. Fuel which enters inlet 88 of cylinder 94 fills interior 116 of piston 96 and is metered out by slot 118 formed in the peripheral wall of piston 96. Vapor flows from slot 118 through circular opening 120 formed in the wall of cylinder 94. Captive air from region 122 of air filter 16 is drawn through inlet openings 124 formed through the outer wall of housing 82 into forward compartment 126 of mixing valve 10. Thus, the appropriate fuel to air mixture is provided in forward compartment 126 of mixing valve 10 and is supplied to the engine in accordance with the operation of vacuum-operated valve 102, which opens in proportion to vacuum present at inlets 24 and 25 of carburetor 27 and as controlled by the conventional operation of conventional butterfly valves 29 used to control the speed of a vehicle by means of linkage 31.

In operation, this system permits an operator of a vehicle to selectively run the vehicle on conventional liquid fuel or vaporized fuel. The system is selectively controlled by four-position switch 40. Assuming the vehicle is to be operated in a conventional manner, ignition switch 44 is closed and switch 40 is set to the position shown in FIG. 1, which supplies 12 volts to open solenoid valve 30, and thus fuel pump 28 supplies fuel directly to input 128 of carburetor 27. In order for the vehicle to initiate operation on vaporized fuel, after a preheat period of a few seconds, switch 40 is moved to position 2. In position 2 battery voltage is applied through diode 66 to energize heating coil 58 of vaporization chamber 12. Once the temperature of vapor in chamber 12 reaches the desired vaporizing temperature, as indicated by temperature gauge 68, the switch is moved to position 3. In this position, no fuel is pumped by fuel pump 28 to either the vaporization system or the conventional system. Thus, the carburetor bowl is emptied by continuing to operate the vehicle normally. Once the fuel in the carburetor bowl is exhausted, switch 40 is moved to the next or last position. In this position, solenoid valve 34 opens and a plus voltage is applied to continue to heat vaporization chamber 12. Thus, the vehicle may now be operated entirely from the vaporized fuel.

Fuel heating may also be accomplished by means of heat derived from the engine exhaust or water heated by the engine. Such an arrangement is diagrammatically illustrated by not water fluid line 140 (coupled to engine hot water jacket-radiator system) which is shown in engagement with fuel line 134. Such an arrangement is particularly advantageous as a fuel preheater, thus lessening the requirement for heating by electrical means which then may be used to arrive at a final desired temperature by thermostatic control means (not shown).

FIG. 3 shows a partial perspective view of a modified variable orifice assembly wherein slot 118 (as shown in FIG. 2) is modified to be tapered, being larger at end 130 than at end 132. This enables an effective leaner mixture of fuel to be supplied to mixing chamber 126 at advanced engine speeds and wherein slot 118 is variably of a greater opening. Typically, the total cross-section of this opening or the rectangular opening shown in FIG. 2 would be of a maximxum area of 1/16 inch. Thus, typically, where the opening is purely rectangular, the opening would typically be of a width of ⅛ inch in length to ½ inch. Where tapered (as shown in FIG. 3), the same cross-sectional area would be maintained, but the dimension at one end would be slightly more than ⅛ inch and at the other end, slightly less than ⅛ inch.

FIG. 4 illustrates the insertion of an orifice in fuel line 134 at point 136 of FIG. 1. This orifice would have a cross-section of 0.0003 to 0.002 inch and would be coordinate with a regulated-fuel output pressure from fuel regulator 36 or otherwise in line 138 of 1 to 7 pounds. The actual pressure provided by regulator 36, of course, must be in excess of the pressure regulator setting of vapor regulator 74, which as indicated, would be in the range of 0.2 to 9 PSI.

From the foregoing, it will be appreciated that the applicant has provided a practical and operable system for operating a gasoline engine on gas vapor with many advantages that accrue therefrom—greater economy and cleaner exhaust emissions.

What is claimed is:

1. A fuel system for a gasoline fueled, spark-ignited internal combustion engine comprising:

fuel supply means;

liquid fuel heating means comprising means for receiving fuel from said fuel supply means and heating, vaporizing, and discharging it;

pressure regulating means having an inlet and an outlet, said inlet being coupled to the discharge of said fuel heating means, and including means for providing fuel vapor at said outlet at a selected pressure in the range of .2 to 2 PSI;

a vapor-fuel air carburetor comprising:

a vapor chamber having an inlet connected to the outlet of said pressure regulator and having a vapor outlet, an elongated cylinder having an opening at one end coupled to said vapor outlet of said vapor chamber and having at least one opening in a side wall thereof, a cylindrical piston positioned within said cylinder and comprising:

a cylindrical body having a hollow interior and an opening at a first end cooperating with said opening in said cylinder and vapor outlet of said vapor chamber, a slot extending through the wall of said cylindrical body, said slot being positioned along a longitudinal dimension of said piston and adapted to cooperate with said opening in said side wall of said cylinder, whereby the passageway between the interior of said piston through said cylinder to the outside of said cylinder varies as said piston is moved longitudinally within said cylinder, a piston-operating arm extending longitudinally from a second and opposite end of said piston, an air-vapor mixing chamber surrounding said cylinder and extending beyond the end of said cylinder, opposite to the end of opening in said cylinder, and said mixing chamber having a plurality of outer openings through which air is admitted into said mixing chamber and an outlet opposite said second end of said piston through which last-named outlet a vapor-air fuel mixture is provided to a said engine;

valve means comprising:

closure means connected to said operating arm of said piston and responsive to vacuum applied by said engine for variably opening said outlet of said mixing chamber and simultaneously varying the passageway between the interior of said piston and said mixing chamber, and spring biasing means for applying a selected closing pressure to said closure means, whereby the degree of opening of said valve means is a function of the differential force between said vacuum and said spring biasing means, whereby an engine being supplied by said carburetor is accelerated and a greater vacuum is drawn, said valve means will be proportionally opened by a greater amount.

2. A fuel system as set forth in claim 1 wherein said liquid fuel heating means comprises:
an elongated member having an inlet coupled to said fuel supply means at one end and a fuel outlet at the other end;
an electrical heating coil positioned along said elongated member; and
means for selectively supplying power to said heating coil.

3. A fuel system as set forth in claim 1 wherein said liquid fuel heating means includes a heating element comprised of a solid block of electrically conductive material having an opening therethrough for the passage of liquid, and electrical means for applying a potential across a region of said block, wherein said block is heated and thereby the fluid passing through said block.

4. A fuel system as set forth in claim 3 wherein said liquid fuel heating means includes means for coupling engine heat to said liquid fuel.

5. A fuel system as set forth in claim 4 wherein said means for coupling engine heat comprises a fluid hot water line.

6. A fuel system as set forth in claim 1 further comprising an orifice between said fuel supply means and said fluid fuel heating means having an opening area in the range of 0.0003 to 0.0006 square inches.

7. A fuel system as set forth in claim 1 wherein said slot in said piston has a maximum cross-sectional opening of 1/16 square inches.

8. A fuel system as set forth in claim 1 wherein said slot is longitudinally ⅛ inch in width and substantially ½ inch in length.

9. A fuel system as set forth in claim 1 wherein said slot is tapered, being substantially ½ inch in length and having an average width of substantially ⅛ inch, being greater than ⅛ inch in width at one end and less than ⅛ inch in width at the other end.

10. A fuel system as set forth in claim 7 wherein the liquid fuel pressure from the liquid fuel supply means to said fuel heating means is in the range of 1 to 7 PSI.

* * * * *